(12) United States Patent
Eves et al.

(10) Patent No.: US 8,433,575 B2
(45) Date of Patent: Apr. 30, 2013

(54) AUGMENTING AN AUDIO SIGNAL VIA EXTRACTION OF MUSICAL FEATURES AND OBTAINING OF MEDIA FRAGMENTS

(75) Inventors: David A. Eves, Crawley (GB); Richard S. Cole, Redhill (GB); Christopher Thorne, East Croydon (GB)

(73) Assignee: AMBX UK Limited, Surrey (GB)

( * ) Notice: Subject to any disclaimer, the term of this patent is extended or adjusted under 35 U.S.C. 154(b) by 1879 days.

(21) Appl. No.: 10/540,315

(22) PCT Filed: Dec. 10, 2003

(86) PCT No.: PCT/IB03/05967
§ 371 (c)(1), (2), (4) Date: Jun. 21, 2005

(87) PCT Pub. No.: WO2004/059986
PCT Pub. Date: Jul. 15, 2004

(65) Prior Publication Data
US 2006/0085182 A1    Apr. 20, 2006

(30) Foreign Application Priority Data
Dec. 24, 2002   (GB) ................................. 0230097.8

(51) Int. Cl.
G10L 11/00 (2006.01)
G10L 21/00 (2006.01)
G10L 15/00 (2006.01)
G10L 13/00 (2006.01)
G10H 7/00 (2006.01)
G06F 7/00 (2006.01)

(52) U.S. Cl.
USPC ........... 704/270; 704/231; 704/236; 704/239; 704/251; 704/254; 704/258; 704/267; 704/275; 84/601; 84/609; 707/600; 707/609

(58) Field of Classification Search .................. 704/231, 704/251, 270; 84/601; 707/3
See application file for complete search history.

(56) References Cited

U.S. PATENT DOCUMENTS

| | | | |
|---|---|---|---|
| 5,038,658 A | 8/1991 | Tsuruta et al. | |
| 5,913,259 A * | 6/1999 | Grubb et al. | 84/610 |
| 6,052,657 A * | 4/2000 | Yamron et al. | 704/9 |
| 6,201,176 B1 * | 3/2001 | Yourlo | 84/609 |
| 6,308,154 B1 * | 10/2001 | Williams et al. | 704/254 |
| 6,355,869 B1 * | 3/2002 | Mitton | 84/603 |
| 6,434,520 B1 * | 8/2002 | Kanevsky et al. | 704/243 |
| 6,504,089 B1 * | 1/2003 | Negishi et al. | 84/609 |
| 6,611,803 B1 * | 8/2003 | Furuyama et al. | 704/254 |
| 6,678,680 B1 * | 1/2004 | Woo | 707/6 |

(Continued)

FOREIGN PATENT DOCUMENTS

| | | |
|---|---|---|
| EP | 0403118 B1 | 12/1990 |
| JP | 06068168 A * | 3/1994 |

(Continued)

OTHER PUBLICATIONS

Nishimura T., et al.(2001). Music Signal Spotting Retrievalby a Humming Query Using Start Frame Feature Depen-dent Continuous Dynamic Programming. Procs ISMIR 2001,211-218.*

(Continued)

Primary Examiner — Paras D Shah
(74) Attorney, Agent, or Firm — Burns & Levinson LLP; Bruce D. Jobse, Esq.

(57) ABSTRACT

A system and method is described in which a multimedia story is rendered to a consumer in dependence on features extracted from an audio signal representing for example a musical selection of the consumer. Features such as key changes and tempo of the music selection are related to dramatic parameters defined by and associated with story arcs, narrative story rules and film or story structure. In one example a selection of a few music tracks provides input audio signals (602) from which musical features are extracted (604), following which a dramatic parameter list and timeline are generated (606). Media fragments are then obtained (608), the fragments having story content associated with the dramatic parameters, and the fragments output (610) with the music selection.

17 Claims, 6 Drawing Sheets

U.S. PATENT DOCUMENTS

Figure 1:
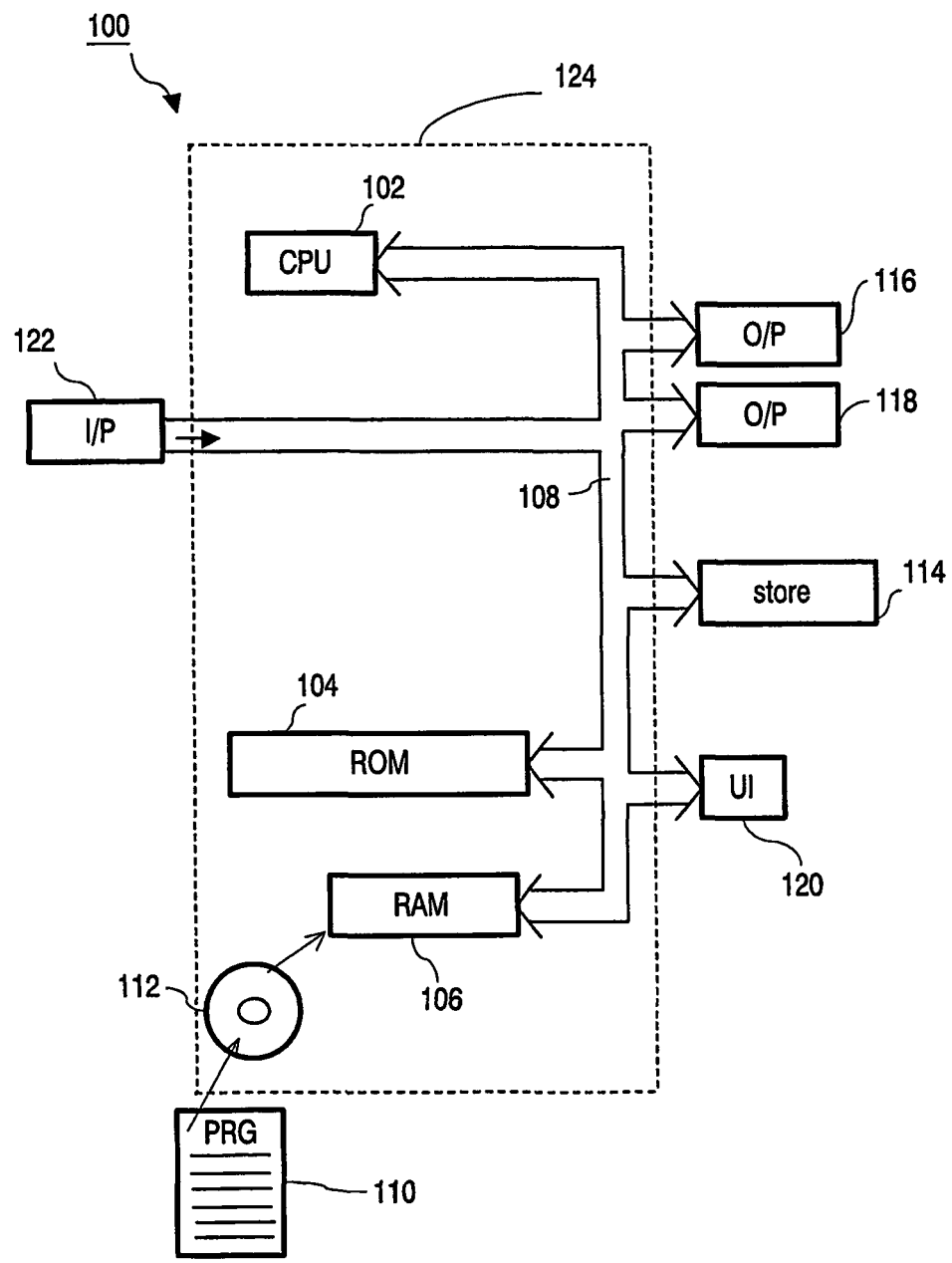

| | | | |
|---|---|---|---|
| 6,714,909 B1* | 3/2004 | Gibbon et al. | 704/246 |
| 6,740,803 B2* | 5/2004 | Brinkman et al. | 84/609 |
| 6,954,894 B1* | 10/2005 | Balnaves et al. | 715/202 |
| 7,022,905 B1* | 4/2006 | Hinman et al. | 84/609 |
| 7,240,003 B2* | 7/2007 | Charlesworth et al. | 704/254 |
| 2002/0106127 A1* | 8/2002 | Kodama et al. | 382/195 |
| 2002/0147592 A1* | 10/2002 | Wilmot et al. | 704/270.1 |
| 2003/0045954 A1* | 3/2003 | Weare et al. | 700/94 |
| 2003/0107592 A1* | 6/2003 | Li et al. | 345/745 |
| 2003/0233930 A1* | 12/2003 | Ozick | 84/610 |
| 2004/0144238 A1* | 7/2004 | Gayama | 84/613 |

FOREIGN PATENT DOCUMENTS

| | | |
|---|---|---|
| WO | WO0111496 A2 * | 2/2001 |
| WO | WO0118655 A1 | 3/2001 |
| WO | WO02092183 A1 | 11/2002 |

OTHER PUBLICATIONS

Nepal, S., Srinivasan, U., and Reynolds, G. 2001. Automatic detection of 'Goal' segments in basketball videos. In Proceedings of the Ninth ACM international Conference on Multimedia (Ottawa, Canada, Sep. 30-Oct. 5, 2001). Multimedia '01, vol. 9. ACM, New York, NY, 261-269. DOI= http://doi.acm.org/10.1145/500141.500181.*

Mihajlovic, V. And Petkovic, M. (2001) Automatic Annotation of Formula 1 Races for Content-Based Video Retrieval. CTIT technical reports series, TR-CTIT-41 . ISSN 13813625, pp. 1-37.*

Bakker, E. M. And Lew, M. S. 2002. Semantic Video Retrieval Using Audio Analysis. In Proceedings of the international Conference on Image and Video Retrieval (Jul. 18-19, 2002). M. S. Lew, N. Sebe, and J. P. Eakins, Eds. Lecture Notes in Computer Science, vol. 2383. Springer-Verlag, London, 271-277.*

Lu, G. 2001. Indexing and Retrieval of Audio: A Survey. Multimedia Tools Appl. 15, 3 (Dec. 2001), 269-290.*

Rui, Y., Gupta, A., and Acero, A. 2000. Automatically extracting highlights for TV Baseball programs. In Proceedings of the Eighth ACM international Conference on Multimedia (Marina del Rey, California, United States). Multimedia '00. ACM, New York, NY, 105-115.*

Matt Welsh, et al: Querying Large Collections of Music for Similarity: UCB-CSD-00-1096, Nov. 1999, CA, USA.

* cited by examiner

| MF | DP |
|---|---|
| MAJ key | HAPPY |
| MIN key | SAD |
| TPO | FAST/SLOW |
| NAK | CLASH |
| | |

FIG.2

| TR | TL | DP |
|---|---|---|
| 1 | 1 | FAST |
| 1 | 2 | HAPPY |
| 2 | 3 | CLASH +SAD |
| 3 | 4 | FAST |
| 3 | 5 | HAPPY |

FIG.3

AUGMENTING AN AUDIO SIGNAL VIA EXTRACTION OF MUSICAL FEATURES AND OBTAINING OF MEDIA FRAGMENTS

The present invention relates to a method and system for augmenting an audio signal in accordance with extracted features of said audio signal. The present invention has particular, but not exclusive, application with systems that determine and extract musical features of an audio signal such as tempo and key.

It is known to augment an audio signal with a video signal. The most common occurrence of this is in the music video industry, where a particular song or album has a video sequence created for the music, usually for the purpose of broadcasting the combined audio and video via a television network. The video signal is created manually, using the experience and talent of a number of people to select and/or create suitable video sequences that best enhances the music. The skill of the people involved is a crucial factor in the quality of the end product. It is also the case that such augmenting is a long and expensive process, with no real guarantee on the suitability of the end product for a large number of users.

Consumer software tools which allow a home consumer to create music and video presentations, according to user input are also known. European Patent Application EP0403118 describes audio/visual compilation in a data processing system such as a home personal computer (PC). The system comprises library, audio, and story authoring and editing modules which enable a user to compile an audio/visual presentation and output it. International Patent Application WO01/18655 discloses a method and system for music video generation on a computer which comprises an editing interface including a selection of foreground, background, import facility and special effects buttons, a timeline for creating a script of instructions for the assembly of graphic images, in synchrony with music, to thereby produce a music video project.

Such known home/consumer systems enable a consumer to produce their own video to augment an audio signal. However, as with video creation in the professional sphere, such creation is time consuming and again relies on the skill of the consumer involved.

Typically, such prior art systems have only limited, if any, automation capabilities, and in general are unable to automatically augment an input ad-hoc audio signal with a video story sequence which depends on, and follows the semantic content of the audio signal.

It is therefore an object of the present invention to provide an improved method and system for augmenting an audio signal.

According to a first aspect of the present invention there is provided a method for augmenting an audio signal comprising receiving an audio signal, extracting features from said audio signal, generating a time ordered table of dramatic parameters according to the extracted features, obtaining media fragments at least in part in dependence on the table of dramatic parameters, and outputting said media fragments.

According to a second aspect of the present invention there is provided a system for augmenting an audio signal, comprising an input device for receiving an audio signal and processing means for extracting features from said received audio signal, for generating a time ordered table of dramatic parameters associated with said extracted features, for obtaining media fragments at least in part in dependence on said generated table of dramatic parameters, and at least one output device for outputting said media fragments.

Owing to the above, extracted music features from an audio signal such as key and tempo a re associated with dramatic parameters representing an overview of a media fragment which may contain an audio/video data file. For example, a fast tempo may fit well with a media fragment having a chase scene that is high speed and furious.

The dramatic parameters advantageously represent features of a story such as mood, pace, incidents and so on. The dramatic parameters are also mapped onto extracted features of the audio signal such as key and tempo.

Advantageously, the media fragments are stored in a database from which they are obtained. Alternatively, the fragments may be generated at runtime in accordance with a story template which comprises a general description or narrative structure for a story, and appropriate dramatic parameters.

For example, a romance story template may have certain requirements such as musical keys associated with happiness (major keys) or sadness (minor keys). A narrative arc describing the progression of a romance story is represented in the story template. One example arc for a romance story may comprise the following, a chance meeting, development of a relationship, a tragedy and a happy or sorrowful ending.

Hence, it becomes possible to generate, obtain and render a story to a consumer, the story being based on a consumers music selection.

For example, a consumer may select four music tracks which are analysed to determine for example genre (or the consumer may input a preferred genre) and musical features are extracted from the tracks. The features are employed to determine a closely matching story template that is then employed to obtain appropriate matching media fragments. For example, media fragments having dramatic parameters indicating major keys (happy), or minor keys (sad) and which also contain romantic content may then be obtained to make up the story.

The media fragments are then rendered to the consumer along with their music selection. Hence, a consumer undergoes a story experience in tandem with, and informed by the selected music.

Advantageously, combinations of musical keys (perhaps a key change within a music track or a key change from music track to music track) may also be employed to determine dramatic moments such as a build up and subsequent release of tension.

In an embodiment the system comprises a personal computer connected to a database storing media fragments and story templates. The computer is provided with program code, which extracts musical features from audio signals representing a musical selection, and also with program code representing a story building module, which selects templates and obtains appropriate media fragments in dependence on determined dramatic parameters related to the extracted musical features. The dramatic parameters are represented in a configurable meta-language such as eXtended Mark-up Language (XML). The computer program matches story templates and media fragments having associated dramatic parameter tags and renders the story to the consumer.

Advantageously, the computer is part of a home network having output devices whereby lighting may be changed at identified dramatic moments, and further aspects of the experiential environment surrounding the consumer may be controlled to provide a compelling story telling experience in conjunction with musical selection. Physical Mark-up Language (PML) may be used to accomplish the aforementioned.

Owing to the invention, it is possible to augment an audio signal, without the need for human input, in a way that nevertheless produces an augmentation that relates to and compliments the audio.

Figure 4:
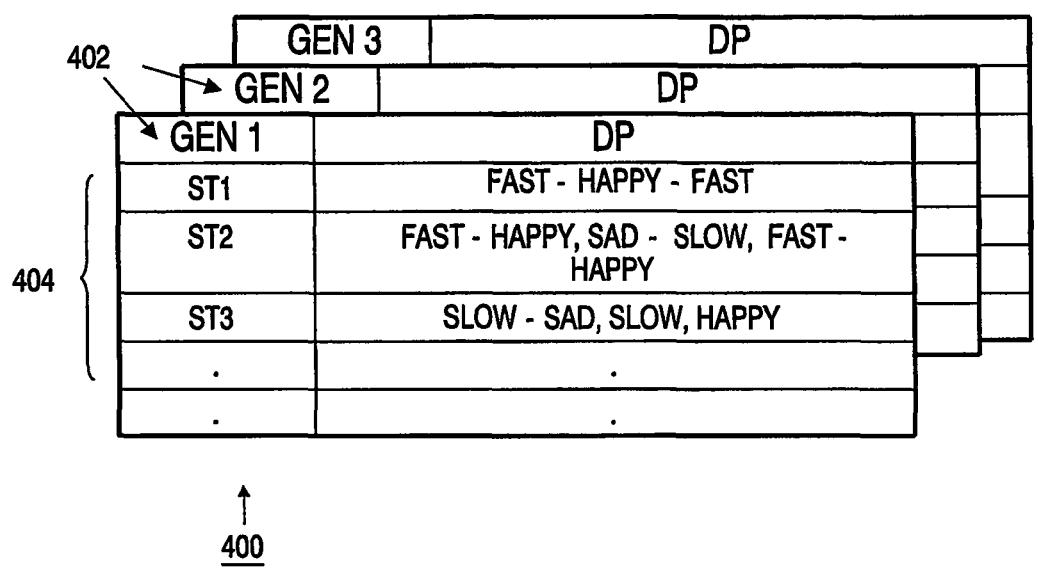
Figure 5:
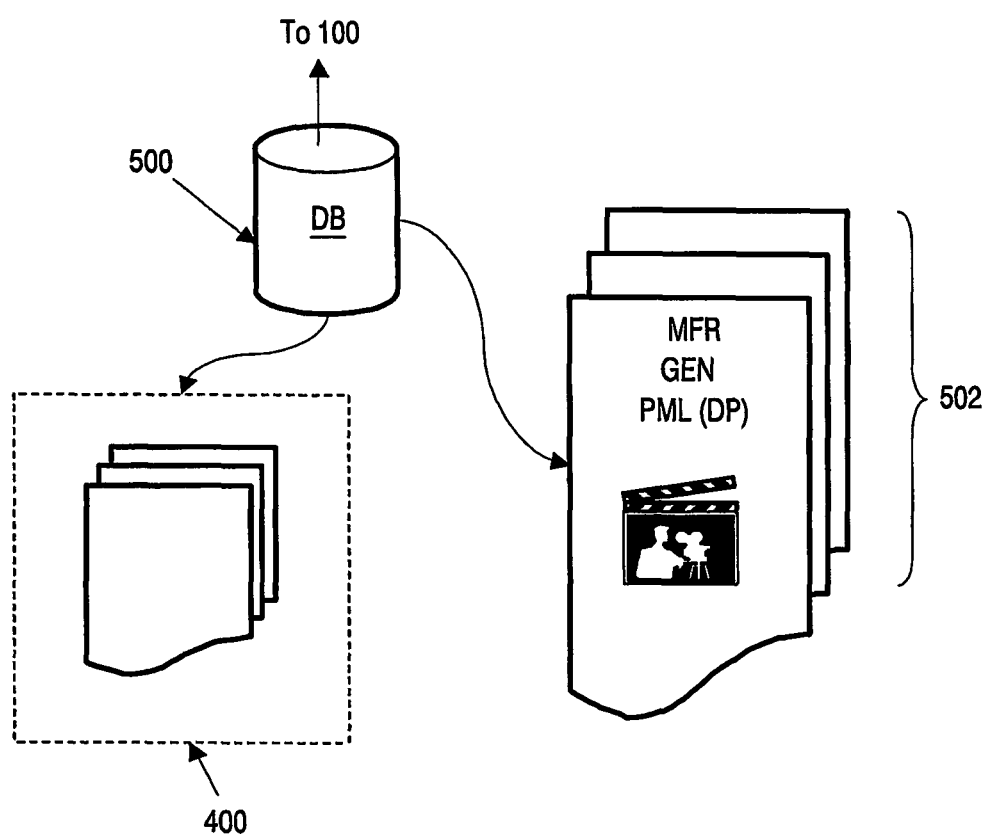
Figure 6:
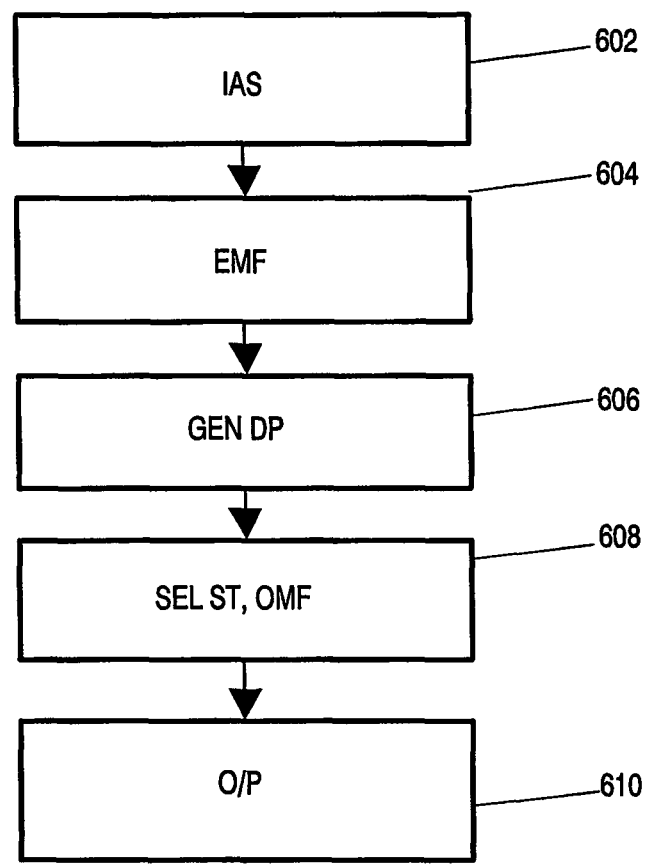
Figure 7:
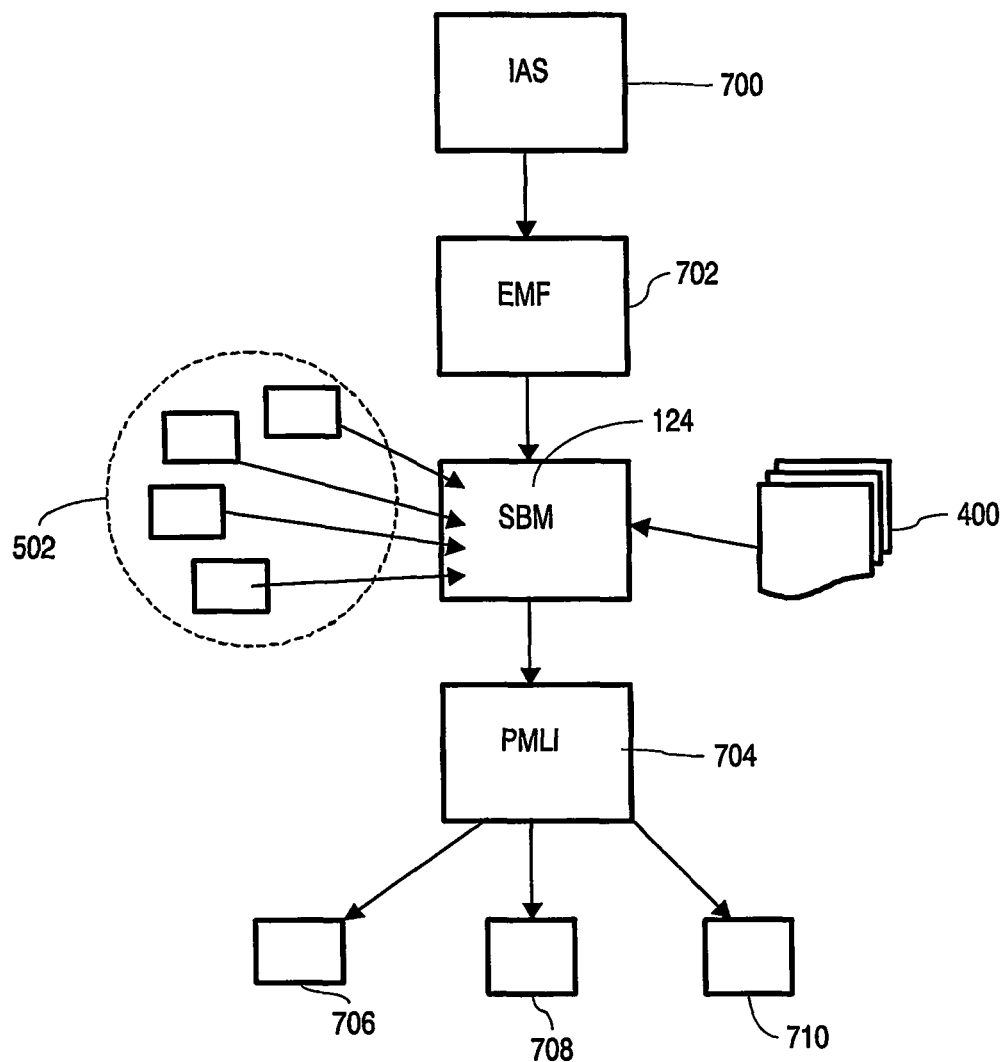

The present invention will now be described, by way of example only, and with reference to the accompanying drawings wherein:

FIG. 1 is a schematic representation of a system for augmenting an audio signal, FIG. 2 is a table relating musical features to dramatic parameters, FIG. 3 is an example of a generated list of dramatic parameters, FIG. 4 is an illustrative example of stored story templates, FIG. 5 illustrates a database storing media fragments, FIG. 6 is a flow diagram of a method for augmenting an audio signal, FIG. 7 is a flow diagram of a PML method for augmenting an audio signal.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments.

FIG. 1 shows a schematic representation of a system 100 for augmenting an audio signal. The system 100 consists of a central processing unit (CPU) 102 connected to memory (ROM) 104 and memory (RAM) 106 via a general data-bus 108. Computer code or software 110 on a carrier 112 may be loaded into RAM 106 (or alternatively provided in ROM 104), the code causing the CPU 102 to perform instructions embodying a method or methods according to the invention. The CPU 102 is connected to a store 114 and to output devices 116, 118. A user interface (UI) 120 is provided.

The system 100 may be embodied as a conventional home personal computer (PC) with the output device 116 taking the form of a computer monitor or display. The store 114 may be a remote database available over a network connection (LAN or WAN). Similarly in a home network (LAN) the output devices 116, 118 may be distributed around the home and comprise for example a wall mounted flat panel display, computer controlled home lighting units, audio speakers placed around the home and so on. The connections between the CPU 102 and other devices 116, 118 may be wireless (for example communications via radio standards IEEE802.11, ZigBee IEE802.15.4 or Bluetooth) or wired (for example communications via wired standards Ethernet, USB), or a combination of both.

The system 100 requires input of audio signals from which features are extracted. The extraction of musical features from audio signals is described in the paper "Querying large collections of music for similarity" (Matt Welsh et al, UC Berkeley Technical Report UCB/CSD-00-1096, November 1999) the contents of which are hereby incorporated. The paper describes how features such as an average tempo, volume, noise, and tonal transitions can be determined from analysing an input audio signal. A method for determining the musical key of an audio signal is described in the U.S. Pat. No. 5,038,658 to Tsuruta et al, hereby incorporated and to which the reader is directed.

Hence, in the system 100 audio signals are input to the CPU 102 by input device 122. The CPU 102 receives the audio signals and extracts musical features such as volume, tempo, and key as described in the aforementioned references. In this embodiment, the audio signal is provided via an internal input device 122 of the PC such as a CD/DVD or hard disc drive. Alternatively, the audio signals may be input via a connection to a networked home entertainment system (Hi-Fi, home cinema etc).

Those skilled in the art will realise that the exact hardware/software configuration and mechanism of provision of input audio signal is not important, rather that such signals are made available to said system 100.

Example data structures and methods of operation will now be described to illustrate aspects of the present invention with regard to, for the sake of simplicity and by way of example only, a PC embodiment of system 100.

FIG. 2 shows an example table 200 for use by computer program 110. The table illustrates a non-exhaustive relationship of extracted musical features 204 (MF) with predetermined and defined dramatic parameters 206 (DP). For example, it is well known that in general music having a Major Key (MAJ key) is associated with happy or uplifting feelings, whereas music played in a Minor key (MIN key) tends to be more sorrowful and sad.

Furthermore, using a circle of 5ths diagram (well known to those studying music) it is possible to determine related musical keys, which are harmonious in that a transition from one key to another is not alarming to a consumer. In general, a transition from one key to an adjacent key on the circle produces to a consumer an acceptable harmonious transition, whereas a leap from one key to a non-adjacent key on the diagram produces an audible clash to a user. For example, closely related (adjacent) keys of C Major/A Minor are F Major/d Minor and G Major/e Minor. Hence, a shift in key from say C Major (either within a music track or from track to track) to E Major (non-adjacent) would result in an audible clash being heard from a user. Such knowledge is useful in developing rules for which music tracks are suitable for cross-fading in and out of each other in an automatic DJ application.

Such knowledge may be used to indicate a dramatic change in a story (for example, a happy marriage scene to a sad tragic scene, with the music adding to the story experience). Hence, in FIG. 2 a musical feature corresponding to such a combination of non-adjacent key changes is represented by (NAK) with the dramatic parameter C LASH. The table also illustrates that a dramatic parameter of FAST or SLOW may be associated with an extracted TEMPO (beats per minute—bpm) result. F or example, a bpm of greater than 120 may be assigned a FAST dramatic parameter, whereas a song or track with a slower tempo may be assigned a SLOW dramatic parameter. Hence, in a general way the mood, changes of pace and incidents according to a music selection may be determined and represented.

The examples of dramatic parameters are for illustrative purposes only, with many possible dramatic parameters in the form of mark up language tags (realised in XML for example) or other attributes. For example, other musical features such as type of instrument (a cello may be assigned a SAD/SLOW attribute), and a high-level genre descriptive tag may be defined. Many audio CD or MP3 archives have genre descriptors associated with a track or CD, e.g. rock, romantic, trance etc and these could be retrieved and assigned dramatic parameters. www.ciracenote.com is an example music database and service provider wherein the music is categorised as rock, electronic/dance, jazz and so on. Electronic/dance music selected from such a service may be associated with a dramatic parameter <FUTURE> or <CYBER> which generally indicates the genre of a story which may be suitable.

By way of example we now illustrate how such tags are used to help build a story informed by music. A consumer, wishing to be entertained, selects three music tracks for playing, track 1 (TR1), track 2 (TR2), and track 3 (TR3) on their PC. The audio signals of the tracks are input by input device 122 to CPU 102, which determines and extracts musical features from the audio signals. The CPU 102, acting under instructions from computer program 110, correlates the determined musical features (MF) 204 with associated dramatic parameters (DP) 206 using table 200 (FIG. 2) and subsequently builds a table 300 as shown in FIG. 3.

The table 300, ordered by time (to create a timeline TL 304), indicates that the CPU 102 has determined that track 1 begins with a FAST tempo and has an associated dramatic parameter HAPPY (i.e. a major key). Following that TR2 clashes (NAK feature determined) and is in a minor key (with a corresponding dramatic parameter SAD). Track 3, similar to track 1 has been determined as being generally FAST (high tempo), and in a major key (HAPPY).

Hence, a high level overview of the music selection is created in which the music evolves dramatically as fast (TEMPO TR1), HAPPY (Major key), a clash (NAK and minor key indicating sadness TR2) and an increase in tempo and happy mood for track 3. Having constructed this high level dramatic overview, the CPU 102 then connects to store 114 to search for a data structure containing a story template with a roughly matching dramatic overview.

FIG. 4 shows illustrative examples of a collection of story templates constructed for use with system 100. The collection may be arranged as shown in the diagram according to genre (GEN 1, GEN 2, GEN 3). The genre may have been indicated by the consumer (via UI 120) or determined by for example reading descriptor tags of the selected music as known in the art. GEN1 may for example represent simple children stories, or horror, or romance or any other story classification genre deemed as suitable. The templates 404 may also store other information such as how many principle characters or protagonists are suitable (perhaps only 3 are needed for a short romance story involving a love triangle).

The story templates 404 each have associated dramatic parameters related to a narrative structure. For example, many stories (particularly Hollywood films) follow a three-act structure in which Act I sets up the characters and story, Act II develops the story and in Act III the story is resolved. Often, at the end of Act I there is an inciting incident which allows the revelation of a character to develop. Hence, Applicants have realised that musical transitions, or track changes may be used (via a NAK detection, for example) to delineate phases of the story or screenplay. Hence, in FIG. 4 story template 1 (ST1) has a simple narrative structure in which dramatic parameters indicate a story arc in which for example the first act is fast, moves onto happy act II and finishes with a fast scene or scenes for act III. An example story which may fit such a template would be a simple children's story in which animal friends race, have a party to celebrate the winner, and subsequently race home.

ST2 however, has a different story arc in which act 11 has dramatic parameters associated with sad and slow scenes. The variability of the story templates is a function of the number of dramatic parameters which can be determined by music feature stage 122. Furthermore, story templates may store information related to the length of time of each act (and hence of the overall story), with short stories having say acts roughly equal to one or two music tracks (6-8 minutes or so on average) whilst longer stories may have longer acts with more dramatic parameters DP to indicate scene changes within an act. Those experienced in the art of story writing and scripting may define other parameters and character rules appertaining to story templates.

In operation, CPU 102 compares the DP of the story templates with those determined from the music selection (FIG. 3) and selects a closely matching template. For example, comparison of the DP determined in FIG. 3 with ST2 of FIG. 4 reveals a match and so ST2 is selected. Having selected a story template 404 the CPU 102 must then populate the template ST2 with actual story content.

FIG. 5 shows an example store 114 in the form of a database 500 that stores a multiplicity of media fragments 502. A media fragment is a data entity comprising for example an encoded segment of film (sometimes referred to as a shot and wherein several shots make up a scene). Hence the media fragment has a certain associated time duration when played. The fragments 502 are characterised by tagged attributes relating to dramatic parameters.

The media fragment may be stored as, by way of example an XML record comprising a description of the audio/visual content of the scene (for example genre-Action, act 1, opening car chase, 4 minutes) and dramatic parameters associated with the content of the scene. Of course, in creating the fragments an overall story may be developed with several different endings and openings (for example, a story may start with a car, or bicycle chase scene) each suitable for different dramatic parameters (TEMPO). This enables some foreshadowing of the story to be maintained whilst still enabling different fragments to be shown in dependence on determined dramatic parameters of the music. Similar scenes having different durations may also be created.

Hence, the computer program instructs CPU 102 to search the database for media fragments 502, which roughly match in terms of duration, act and dramatic parameters the selected story template. The fragments are obtained, ordered and cached in memory 106 (or hard disk drive), and subsequently output with the music. The database 500 may also optionally store, for convenience, the story templates 400 as illustrated in FIG. 5.

For example, with reference to the DP list generated in FIG. 3 and the selected story template (ST2) of FIG. 4, and wherein a children's genre has been indicated (perhaps by the child itself via UI 120). Story fragments having a children's genre tag are searched to match the determined timeline (TL) and dramatic parameters (DP). Suppose track 1 (TR1) lasts for 4 minutes, then an opening media fragment is searched for which has a DP combination (FAST-HAPPY) and which lasts for roughly 4 minutes. Similarly, a media fragment (related to the first selected fragment) for act II having a slower pace and a sad theme is searched for and which will last roughly the duration of track 2. Finally media fragments tagged as having a fast/happy ending and related to the first fragment are selected for rendering with track 3.

Hence, having identified and obtained suitable media fragments 502, the story is output on, in this PC embodiment, the display monitor 116.

FIG. 6 illustrates a flowchart showing the steps described above. In step 602 an audio signal representing the music selection is input (IAS) and musical features extracted (EMF) in step 604. A dramatic parameter list characterising the music is generated (GEN DP) in step 606 following which in step 608 a story template is selected (ST) and used in conjunction with the dramatic parameters to obtain appropriate media fragments (OMF). Finally in step 610, the story is output (O/P) together with the music selection.

Those skilled in the art will realise that the story may not be contiguous. Content in the form of stylised comic book frames may be employed within media fragments, hence easing the time duration matching requirements and enabling easier matching of scene output with identified dramatic moments in the selected music. Such "pre-canned" comic, cartoon or computer generated visual content may be relatively quickly created and indexed, enabling quick establishment of a substantial database having many story templates and media fragments available. The fragments may be stored in any convenient fashion, for example as MPEG files linked with records indexing the files in terms of dramatic parameters, genre, characters and so on.

In the above example, pre-canned content was retrieved for a user in dependence on a story template having a timeline which roughly matched the duration of the music selection. However, having selected a particular story template, the media fragments may be computer generated at runtime by processor 102. For example, a media fragment may contain computer generated content in the form of a simple cartoon for a child. The matching of the fragments with the timeline of the music selection is then relatively simple since processor 102 generates the actual media fragment and its content. Of course, the need for story templates may be obviated in such a case, with simple rules (ACT 1, ACT 2, ACT 3, DP-HAPPY, FAST, HAPPY) aiding the generation of the media fragments making up the story.

In another embodiment illustrating advantageous aspects of an ambient intelligence system, the module represented by dashed outline 124 in FIG. 1 is implemented as a home network plug-in module 124 with network links to various output devices 116, 118 which are compliant with a mark-up language and instruction set designed to deliver real world experiences. An example of such a physical mark-up language (PML) is described in Applicants co-pending application WO 02/092183. PML comprises a means to author, communicate and render experiences to an end user so that the end user experiences a certain level of immersion within a real physical space. For example, PML enabled consumer devices such as a HI-FI and lighting system can receive instructions from a host network device (the instructions may be embedded within a DVD video stream for example) that causes the lights or sound output from the devices to be modified. Hence a dark scene in a movie causes the lights in the consumer's home to darken appropriately.

PML is in general a high level descriptive mark-up language which may be realised in XML with descriptors which relate to real world events (<dim light>). Hence, PML enables devices around the home to augment an experience for a consumer in a standardised fashion.

FIG. 7 illustrates an example PML flowchart embodying aspects of the present invention. Audio signals are input (IAS) 700 and analysed for music features (EMF) 702. The features are provided to the story building module 124 which generates a dramatic parameter table and timeline as previously described. The module 124 selects a story template 400 in dependence on the generated table and obtains suitable media fragments 502. The fragments (which may be pre-canned or runtime generated) include PML descriptors as well as dramatic parameters. The fragments are then assembled by the module 124, and provided to a PML interpreter (PMLI) 704.

Hence, PML commands associated with the fragments are interpreted and subsequently directed to PML enabled devices 706, 708, 710 on the home network. For example, devices 706, 708 may represent a PML lighting system and a PML projector. The devices respond to PML commands so as to for example, project changing lighting levels and colours on a wall at certain moments in the narrative and audio experience associated with the selected music and obtained media fragments. Other devices 710 such as desktop fans, or air conditioning and heating systems may be controlled in dependence on the dramatic features in order to further augment the input audio signals and output story experience.

In the above a system suitable for augmenting audio signals by providing a narrative story experience was described. The system may be in the form of a dedicated module 124, or a general purpose computer, operating alone or in tandem with other devices on a consumer network. Extracted musical features such as key, key changes, tempo and so on are input to the computer which then relates the features to dramatic parameters. Appropriate media fragments are then obtained and subsequently output and rendered to a user. Other output devices may be used to further enhance and augment the story.

From reading the present disclosure, other modifications will be apparent to persons skilled in the art. Such modifications may involve other features which are already known in the design, manufacture and use of multimedia system and component parts thereof and which may be used instead of or in addition to features already described herein without departing from the spirit and scope of the present invention. Furthermore, narrative structures and media fragments may vary from the explicit examples herein described without departing from the spirit and scope of the present invention.

The invention claimed is:

1. A method for augmenting an audio signal comprising acts of:
   receiving an audio signal,
   extracting features from said audio signal,
   generating a time ordered table of dramatic parameters according to the extracted features, wherein the dramatic parameters include mood, changes of pace and incidents,
   selecting a story template at least in part in dependence on said table of dramatic parameters, wherein said story template comprises dramatic parameter data related to a narrative story structure,
   obtaining media fragments at least in part in dependence on the table of dramatic parameters by matching the dramatic parameters of the selected story template with those of the media fragments, and
   outputting said media fragments in tandem with said audio signal.

2. The method according to claim 1, wherein said features extracted from said audio signal include one or more of tempo, key, volume.

3. The method according to claim 1, wherein the generation of said table of dramatic parameters comprises retrieving a list of dramatic parameters and associated audio features, comparing and matching the extracted features with the retrieved associated audio features, and inserting an entry comprising the dramatic parameter associated with the audio feature.

4. The method according to claim 1, wherein said obtaining said media fragments comprises selecting a fragment from a store, said fragment being stored with an associated dramatic parameter which matches the respective entry in the table of dramatic parameters.

5. The method according to claim 1, wherein said obtaining said media fragments comprises generating a fragment.

6. The method according to claim 4, and further comprising receiving user input, said user input affecting said obtaining.

7. The method according to claim 1, wherein said media fragments include video data.

8. The method according to claim 1, wherein said outputting comprises storing said media fragments and said audio signal.

9. The method according to claim 1, wherein said outputting comprises rendering said media fragments and said audio signal.

10. The method according to claim 1, wherein the story template for selection is generated according to logical story structure rules and the dramatic parameter list.

11. The method according to claim 1, wherein the dramatic parameters are represented by physical mark up language tags.

12. The method according to claim 1, wherein combinations of extracted features have associated dramatic parameters.

13. A system for augmenting an audio signal comprising:
an input device for receiving an audio signal, and
processing means for extracting features from said received audio signal, and for generating a time ordered table of dramatic parameters associated with said extracted features, and for selecting a story template at least in part in dependence on said table of dramatic parameters, wherein said story template comprises dramatic parameter data related to a narrative story structure, and further for obtaining media fragments at least in part in dependence on said generated table of dramatic parameters by matching the dramatic parameters of the selected story template with those of the media fragments, and
at least one output device for outputting said media fragments in tandem with said audio signal, and
wherein the dramatic parameters include mood, changes of pace and incidents.

14. The system according to claim 13, further comprising storage for storing said media fragments.

15. The system according to claim 13, wherein said at least one output device comprises display means on which said media fragments are displayed.

16. The system according to claim 13, wherein said at least one output device is responsive to instructions associated with said dramatic parameters.

17. The system of claim 13, comprising a database storing media fragments with associated dramatic parameters.

* * * * *